April 18, 1939.  T. F. PEARSON  2,154,992
LEHR STACKER
Filed Feb. 5, 1937  2 Sheets-Sheet 1
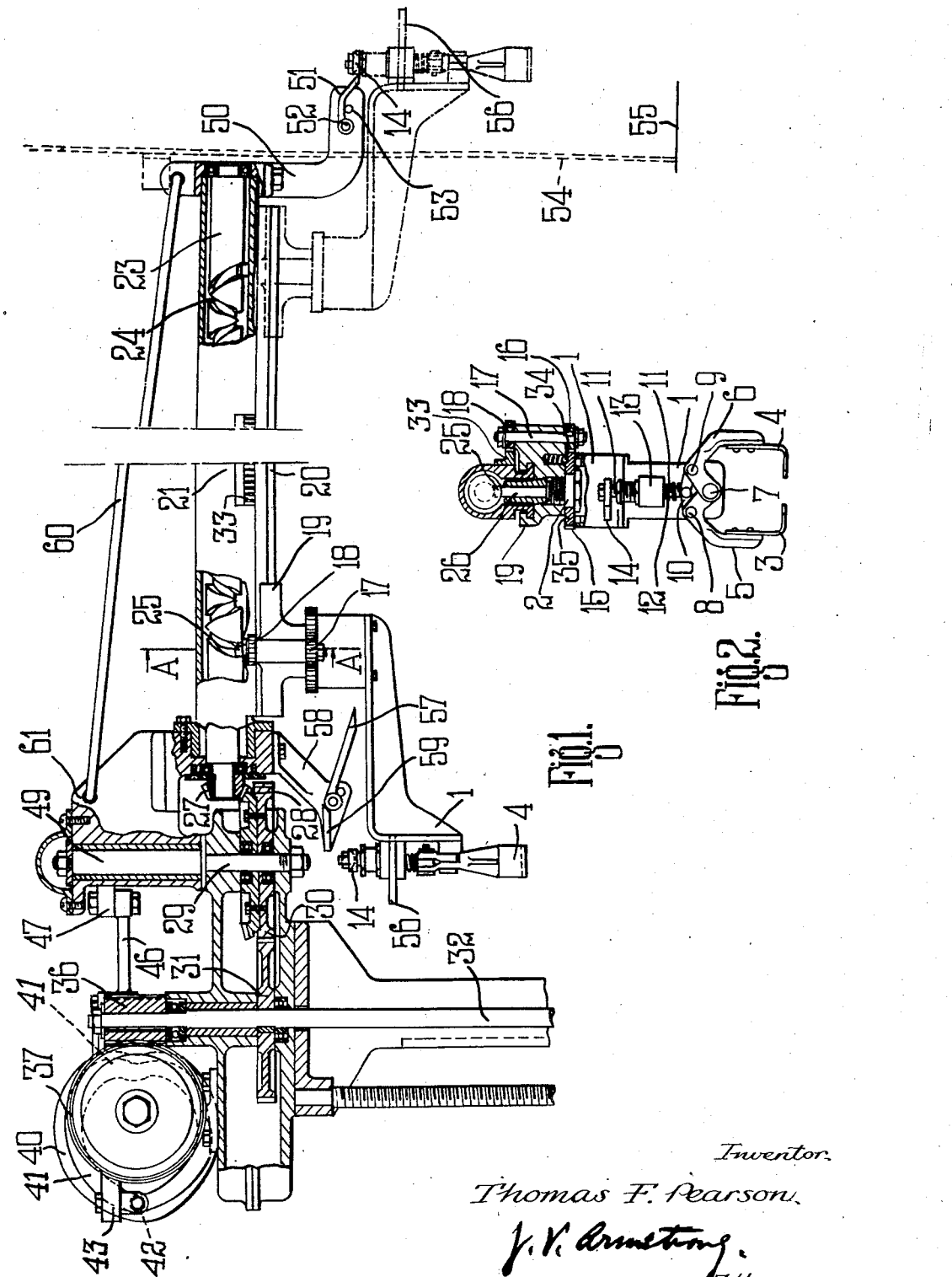
Inventor
Thomas F. Pearson
J. V. Armstrong
Attorneys April 18, 1939.  T. F. PEARSON  2,154,992
LEHR STACKER
Filed Feb. 5, 1937  2 Sheets-Sheet 2
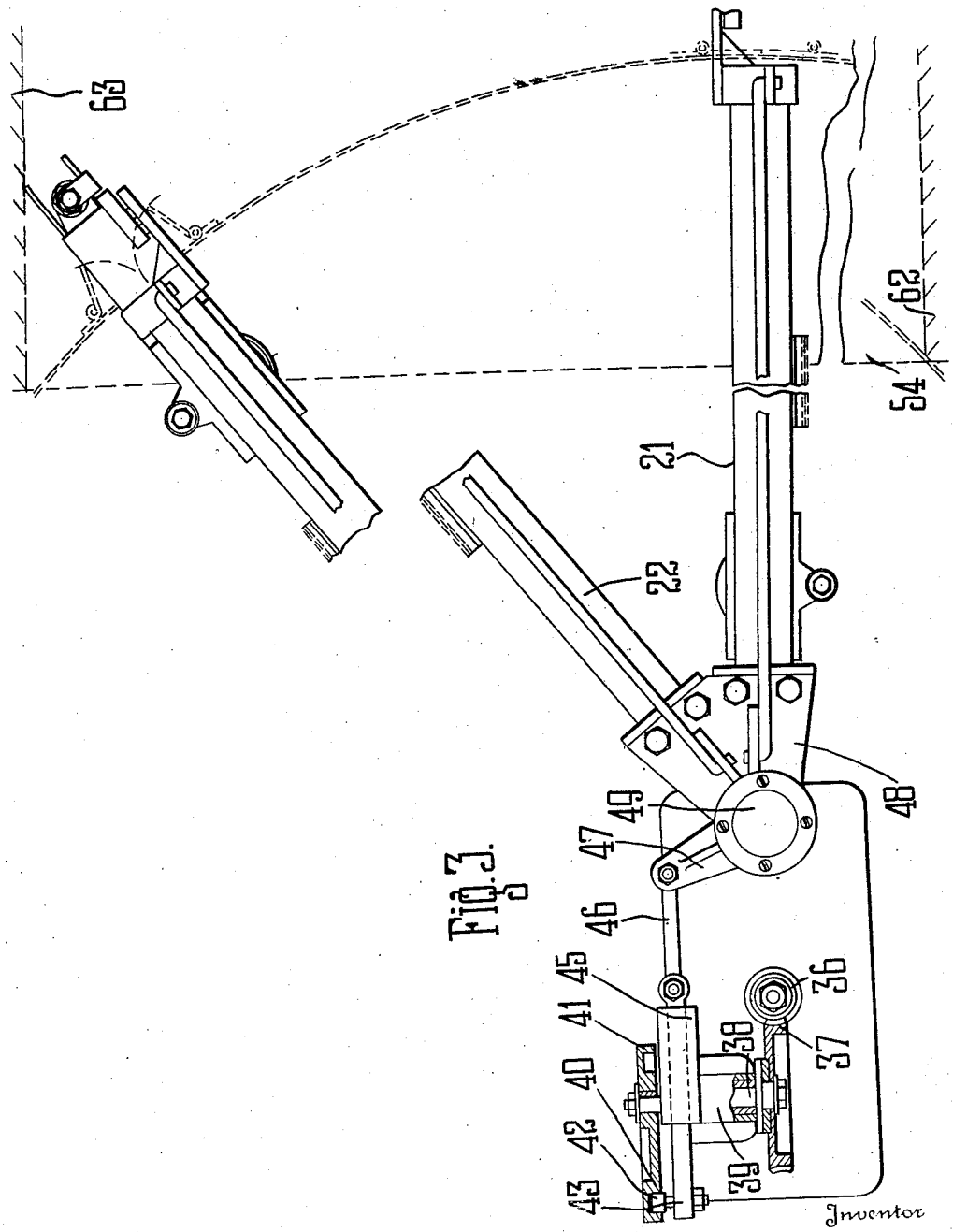
Inventor
Thomas F. Pearson.
By J. V. Armstrong
Attorneys

Patented Apr. 18, 1939

2,154,992

UNITED STATES PATENT OFFICE

2,154,992

LEHR STACKER

Thomas Finney Pearson, Pontefract, England, assignor to Crown Cork & Seal Company, Inc., New York, N. Y., a corporation of New York Application February 5, 1937, Serial No. 124,338
In Great Britain February 7, 1936

12 Claims. (Cl. 214—1)

The present invention relates to the handling of glassware and more particularly to means for transferring bottles or other hollow articles of glassware when in a hot state from a forming machine or a conveyor associated therewith to a lehr so that the glassware may be annealed.

According to the present invention, one or more carriers for transferring an article of glassware from a point adjacent to a blowing or forming machine to a lehr are mounted to be displaced axially on a guide and rotatable about a vertical axis.

In a preferred form of construction a pair of carriers are provided each mounted on arms displaceable about a vertical pivot on elements sliding axially along a pair of guideways and so interconnected from a common drive that one is moving outwards towards a lehr whilst the other is moving inwards.

If desired, the two guideways may themselves turn in unison about a vertical pivot to place articles within the lehr in sequence laterally across the width of the same; that is to say, where a pair of guideways are provided one arm will distribute articles over one half the lehr, whilst the carrier on the other guideway will distribute articles over the other half width.

The invention is more particularly described with reference to the accompanying drawings in which:

Figure 1 is a side elevation partly in section of one form of device.

Figure 2 is an end view partly in section of one of the carriers.

Figure 3 is a plan view corresponding to Figure 1.

A pick-up head or device of any desired form is mounted on a carrier 1 swinging about a vertical pivot 2. In the preferred form of pick-up as shown in the drawings, this comprises a pair of jaws 3, 4, adapted to engage the articles, such for instance, as round the neck of a glass bottle, which jaws are mounted on bell crank levers 5, 6, pivoted about a common pivot 7 on the carrier 1 and having their pivots 8, 9, connected by links 10 to a spindle 11 controlled by a spring 12 extending through a guide 13 on the carrier 1 to project from the opposite side thereof, where it is provided with a lifting lug 14.

The carrier 1 is rotatable about the spindle 2 by reason of a pinion 15 upon it engaging with a pinion 16 keyed to a parallel spindle 17, which spindle has a second pinion 18 keyed to it. The whole carrier 1 is mounted on a guide 19 displaceable along a guideway 20 on an arm 21, which arm may be duplicated as shown at 22 in the drawings. Each arm is hollow and mounted within the arm is a rotary spindle 23 having a right and left-hand groove 24 in it running into one another at the front and rear ends to engage with a peg 25 on a spindle 26 mounted in the guide 19.

Each spindle 23 has a bevel wheel 27 upon it meshing with a crown wheel 28 freely rotatable about a stub spindle 29 rotated by a gear wheel 30 meshing with a gear wheel 31 on a main driving shaft 32 so that each quick threaded right and left-handed spindle 23 is continuously rotated the whole of the time.

It will consequently be seen that the carriers 1 on their guides 19 are moved axially along the arms 21, 22, these preferably being timed so that one carrier is moving outwards on the one arm 21 whilst the other is moving inwards. As stated above, both spindles 23 are driven in unison by the crown gear 28. As shown in Figure 3, the two carriers 1 on the arms 21, 22 which are driven by these spindles are disposed respectively at the inner and outer ends of the arms. This arrangement of parts effects the desired timing of the movements of the two carriers.

It will further be seen that as each carrier moves outwards the pinion 18 will for a portion of the travel of the guide 19 along the guideway 20 engage with a fixed rack bar 33, which extends only for a short portion of the guideway 20. Consequently, as the carrier 1 is displaced axially of the arm 21, it will be turned about the axis of the spindle 17 immediately the gear wheel 18 commences to mesh with the rack 33, and thus be swung about a vertical axis through 180° from the position shown in dotted lines. Means, such as a spring ball catch 34 engage with one or other of a pair of depressions 35, 180° apart in the top surface of the carrier 1.

The main driving shaft 32 has a worm 36 upon it in constant mesh with a worm wheel 37 mounted on a spindle 38 rotating in a bearing 39 on the frame of the machine, which spindle 38 has a cam plate 40 keyed to it, the cam groove 41 of which engages with a roller or peg 42 on the end of a bar 43 sliding in a guide 45 on the frame of the machine, and connected by a link 46 with an arm 47 integral with a bracket 48 supporting both arms 21 and 22, to swing these about their bearing on a fixed spindle 49 forming an extension of the spindle 29.

Each arm 21, 22 has at its outer end a bracket 50 carrying a pivoted latch 51 freely pivoted about a pivot 52 and dropping by gravity against a stop 53. As the arm 14 of the carrier moves past it on its outward displacement towards the lehr 54, the finger 51 will be lifted, but as the carrier 1 commences to move backwards the convex lower side of the arm 14 will ride over the top surface of the latch or finger 51 raising the spindle 11 in its bearing 13 and thus opening the jaws 3, 4, to release an article, and allow it to come into position to be supported upon the conveyor 55 of the lehr.

Preferably a finger 56 is provided on the carrier 1 for the purpose of automatically pushing open the inlet doors of the lehr.

On the return of the carrier 1 the convex underside of the arm 14 rides over a similar gravity pivoted latch 57 on a bracket 58 attached to the inner ends of the arms 21, 22, which causes jaws 3, 4, to again open in order that they may engage over an article and grip it as the arm 14 clears the fixed drag piece 59 on this bracket 58.

As shown in the drawings, the two arms 21 and 22 will be oscillated in unison about the axis of the spindle 49, by the cam groove 41 formed in the face of the cam 40 of a contour as shown in Figure 1. This cam is so cut that it will first cause a gradual traverse of the arms 21 and 22, so that articles are laid by, let us say, the arm 21 from a position adjacent one wall 62 of the lehr, and then step by step across to the centre, whilst the other arm 22 is controlling the laying of articles picked up by its carrier from the centre line of the lehr to the opposite wall 63.

I declare that what I claim is:

1. An apparatus for delivering glass articles to a lehr, comprising a guide extending toward the lehr and pivotally supported on a vertical axis at its end remote from the lehr, an arm slidably supported at one end on the guide, means at the other end of the arm for picking up an article, means for displacing the arm along the guide, means for turning the arm on a vertical axis through 180° during said displacement, and means actuated by the displacement of the arm along the guide for releasing the articles at a predetermined point in such displacement.

2. A lehr stacker comprising a pair of guides disposed in angular relation and pivotally supported on a common vertical axis exteriorly of the lehr and projecting toward the lehr, a slide on each guide, an arm pivoted at one end on each slide, ware grasping means at the free end of each arm, means for moving the slides along the guides, and means for turning each arm through 180° during its movement along its guide.

3. An apparatus for delivering glass articles to a lehr comprising means for picking up articles at a common point, said means comprising a plurality of carriers, angularly disposed guides supporting the carriers and extending radially in fixed angular relation from said point as a center, means for displacing the carriers radially from said common point along said guides, and means for depositing the articles in sequence from said carriers in the lehr at spaced points along different segments of a common arc.

4. A device for delivering glass articles to a lehr comprising a pair of rigidly inter-connected, elongated guide arms extending toward the entrance end of the lehr, a pair of clamp means for conveying glass articles, a carrier for each clamp, slidably mounted on one of said arms, means to displace each carrier longitudinally of its guide arm, means to rotate each carrier about a vertical axis, and means to operate each clamp means to engage and release a glass article at the respective ends of said guide arms.

5. A device for delivering glass articles to a lehr comprising a pair of relatively fixed elongated guide arms pivotally mounted about a common vertical axis, a pair of clamp means for conveying glass articles, a pair of carriers therefor, a continuously rotating threaded spindle on said guide, interengaging means between each threaded spindle and the carrier associated therewith, means to rotate each carrier through 180° about a vertical axis whilst so engaged, and means to engage or release a glass article as each carrier reaches the respective ends of said guide.

6. A device for delivering glass articles to a lehr comprising a clamp for conveying a glass article, a carrier therefor, a guide for said carrier, a continuously rotating right and left hand continuously threaded spindle on said guide, interengaging means between said threaded spindle and said carrier, means to rotate said carrier through 180° about a vertical axis whilst so engaged, and abutment means adjacent the ends of the guide to close and to open the clamp to cause the same to engage or release a glass article as the carrier reaches the respective ends of said guide.

7. A device for delivering glass articles to a lehr comprising a plurality of clamp means for conveying a glass article, carriers therefor, a pair of rigidly interconnected, elongated guides therefor extending in angular relation from their point of interconnection, means to reciprocate said carriers along said guides radially of a common pick up place vertically aligned with the point of interconnection of said guides, means to rotate said carriers 180° from said pick up place to a place in line with said guides, means to rotate said carriers 180° from a place in line with said guides to a place beyond the guides and within range of the lehr, means to operate said clamps after one half rotation to pick up an article and means to operate said clamps after the other half rotation to release the articles on to the lehr.

8. A device for delivering glass articles to a lehr comprising a pair of clamp means for conveying glass articles, carriers therefor, a pair of rigidly interconnected, elongated guides pivotally mounted about a common vertical axis, each of said guides serving as a movable support for one of said carriers, means to displace each carrier longitudinally of its guide, means to rotate each carrier about a vertical axis, and means to operate said clamp means to engage and release a glass article at the respective ends of said guides, means to angularly displace both of said guides in unison about a vertical axis to deposit articles over the width of the lehr in sequence.

9. A device for delivering glass articles to a lehr comprising a plurality of clamp means for conveying glass articles, carriers therefor, guides therefor, means to reciprocate said carriers alternately in opposite directions along said guides radially of a common pick up place, means to rotate said carriers 180° from a position in line with said guides to a place in line with said pick up spot, means to rotate said carriers 180° from a position in line with the pick up spot to a place beyond the guides and within range of the lehr, means to operate said clamps after one half rotation to pick up an article and means to operate said clamps after the other half rotation to release the article on to the lehr, and means to angularly displace said guides about a vertical axis to deposit articles over portions of the width of the lehr in sequence.

10. A device for delivering glass articles to a lehr comprising a plurality of clamp means for conveying glass articles, carriers therefor, guides therefor, rigidly interconnected and pivotally mounted about a common vertical axis, means to reciprocate said carriers along said guides radially of a common pick up place in line with said vertical axis, means to rotate said carriers 180° from said pick up spot to a place in line with said guides, means to rotate said carriers 180° from a place in line with said guides to a place beyond the guides and within range of the lehr, means to operate said clamps after one half rotation to pick up an article and means to operate said clamps after the other half rotation to release the article on to the lehr, means to angularly displace said guides in unison about said vertical axis to deposit articles in the lehr over portions of a common arc concentric with the pick up place.

11. A device for delivering glass articles to a lehr comprising a pair of normally closed pick up jaws, a carrier arm therefor, a guide intersecting the pick up place but not extending thereto, a vertical pivot for the carrier arm on said guide, means to reciprocate said pivot along said guide, means to turn said arm through 180° of arc about said pivot along a portion of its displacement along the guide, means to temporarily open and then close said jaws as said pivot recedes from one end of the guide and means to open and then close said jaws as the pivot approaches the opposite end of said guide.

12. A device for delivering glass articles to a lehr, comprising a pair of pick up jaws, an arm carrying each of said jaws, a pair of guide members disposed in angular relation, a carrier on each of said guides, a vertical pivot for each arm on said carrier, a rack on said guide, a pinion on each arm engaged periodically by said rack, a double reverse threaded spindle on each guide, means to rotate each spindle continuously, stop means at each end of each guide automatically operating said pick-up jaws, and means to swing said guide members in unison about a vertical axis remote from the lehr.

THOMAS FINNEY PEARSON.